United States Patent [19]

Hannemann et al.

[11] 4,115,704
[45] Sep. 19, 1978

[54] PARAMETRIC ENERGY COUPLED UNINTERRUPTIBLE POWER SUPPLY

[75] Inventors: Dennis M. Hannemann, Vienna, Va.; Kwang Ta Huang, Ventura; Dallas M. Shiroma, Oxnard, both of Calif.

[73] Assignee: The United States of America as represented by the Secretary of the Navy, Washington, D.C.

[21] Appl. No.: 791,458

[22] Filed: Apr. 27, 1977

[51] Int. Cl.[2] .............................................. H02J 9/00
[52] U.S. Cl. ......................................... 307/64; 307/72; 323/60
[58] Field of Search ............................. 307/64–66, 307/72, 74, 76, 86, 87; 323/7, 60

[56] References Cited

U.S. PATENT DOCUMENTS

| | | | |
|---|---|---|---|
| 3,679,962 | 7/1972 | Wanlass | 323/60 X |
| 3,745,365 | 7/1973 | Spreadbury et al. | 307/64 |
| 3,980,921 | 9/1976 | Izawa | 323/7 X |
| 3,991,319 | 11/1976 | Servos et al. | 307/64 |
| 3,999,077 | 12/1976 | Borkovitz et al. | 307/66 |
| 4,010,381 | 3/1977 | Fickenscher et al. | 307/66 |

*Primary Examiner*—A. D. Pellinen
*Attorney, Agent, or Firm*—Richard S. Sciascia; Joseph M. St. Amand; Darrell E. Hollis

[57] ABSTRACT

A parametric energy coupling system for providing uninterruptible a-c power to electrical loads. In a normal mode, a parametric transformer couples a-c line power directly from an a-c power source to a load. Upon a power outage occurrence, an inverter is energized whereby a-c power is generated from a d-c source and applied to the load.

11 Claims, 3 Drawing Figures

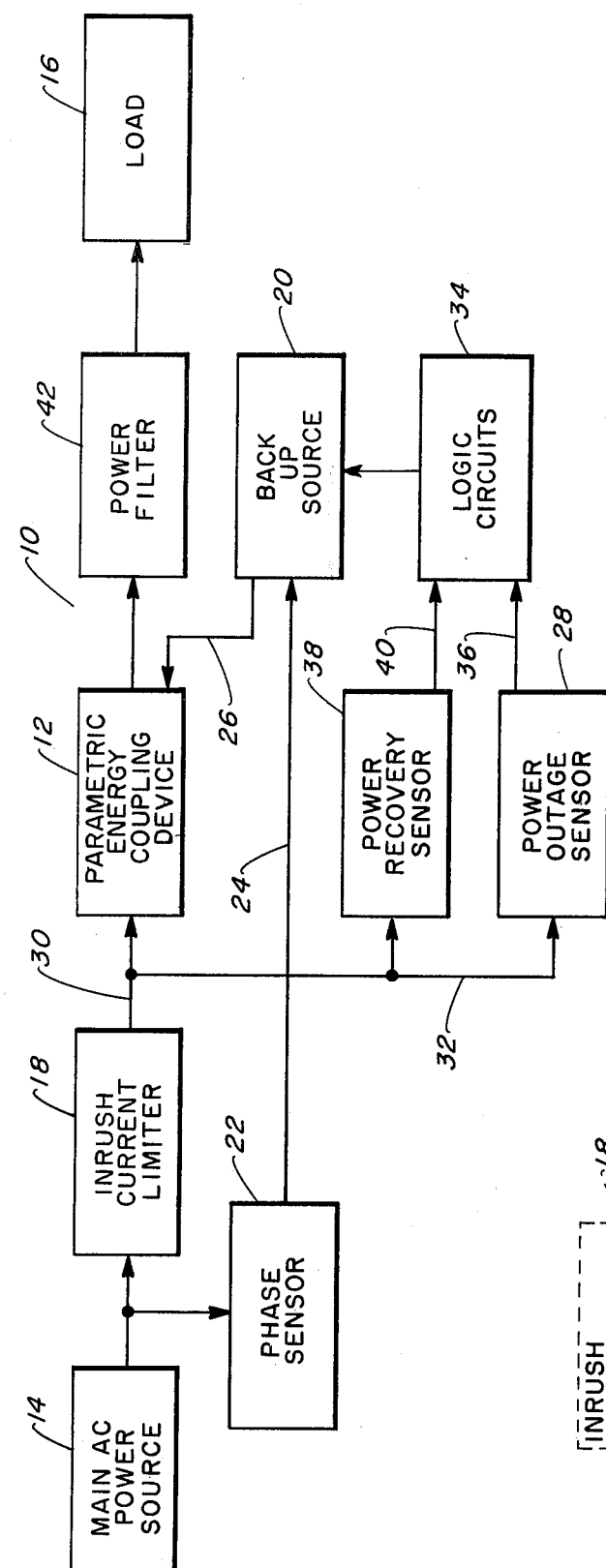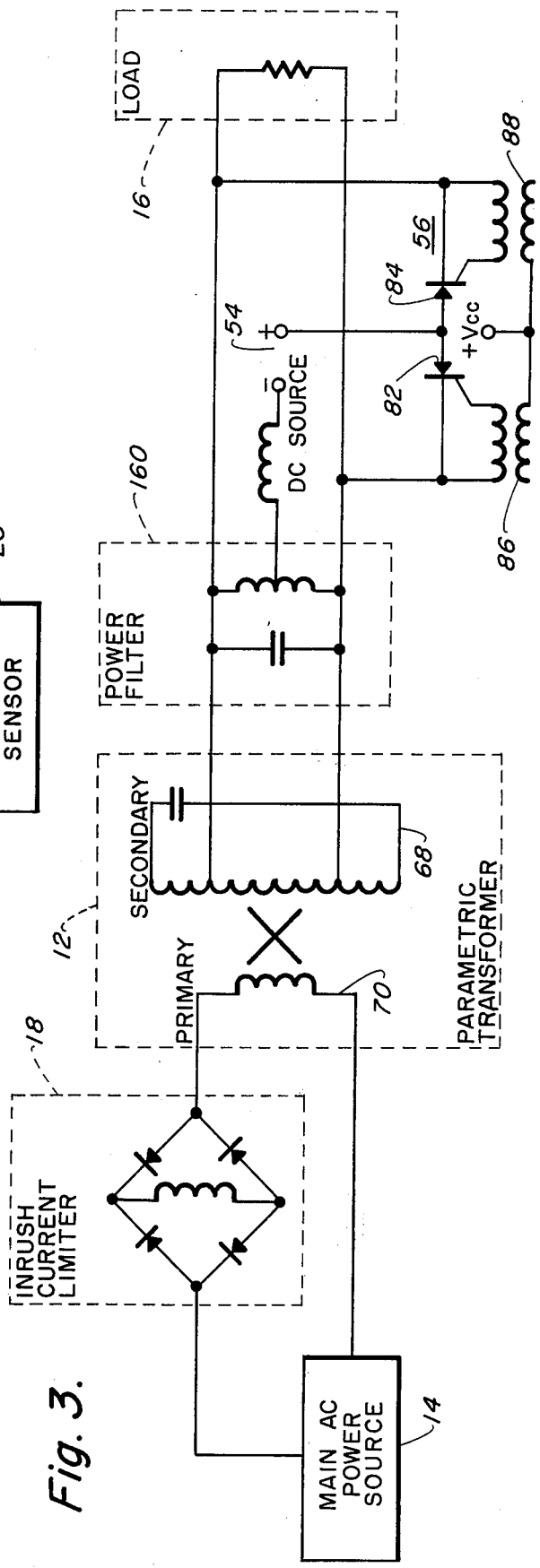
Fig. 1.
Fig. 3.

PARAMETRIC ENERGY COUPLED UNINTERRUPTIBLE POWER SUPPLY

BACKGROUND OF THE INVENTION

1. Field of the Invention

The present invention relates generally to an alternating current power distribution system, and in particular to an alternating current power distribution system supplied alternatively from a line alternating current power source and from a backup direct current power source.

2. Description of the Prior Art

There exists in the prior art a multitude of a-c power systems having alternate source of supply capability. The conventional method employed by such systems includes utilizing a ferro resonant voltage regulator circuit to couple a-c power to a load with control circuitry for sensing voltage outages and supplying an alternate source of a-c power to a load during such voltage outages.

A major disadvantage of the conventional systems are that such systems utilize flux coupling in the ferro resonant voltage regulator circuit to couple the a-c power to the load. Thus, a switch is required to disconnect the a-c line power source from the ferro resonant voltage regulator circuit when the alternate source of a-c power is energized because the ferro resonant voltage regulator circuit will reflect the a-c power generated by the alternate source of a-c power through the voltage regulator circuit to the a-c line power source.

SUMMARY OF THE INVENTION

The present invention overcomes these problems by utilizing parametric oscillation to couple an a-c line power source to a load. Since there is no direct flux coupling and no reflection with parametric oscillation, no disconnection switch is required. In accordance with one embodiment of the present invention, a parametric energy coupling device couples a-c line power to a load. A backup source is energized when a power outage sensor senses a power outage in the a-c line power. A phase sensor is employed to shift the phase of the a-c power generated by the backup source with respect to the a-c line power by 90°. This compensates for the 90° phase shift imparted to the a-c line power by the parametric energy coupling device.

Accordingly, one object of the present invention is to provide an a-c power distribution circuit capable of supplying continuous, uninterruptible a-c power to a load in the event of outages or faults in the a-c line power source.

Another object of the present invention is to provide oscillation between the a-c line power source and the load in the event of outages or faults without the use of mechanical or solid-state switches.

A still further object of the present invention is to provide transient suppression for the load.

A still further object of the present invention is to provide an a-c power distribution system that will energize a backup source in the event of outages or a decrease of greater than 10 percent in a-c line power so that the a-c power supplied to the load is continuous and uninterrupted.

Another object of the present invention is to synchronize the phases of the a-c line power source and the backup source.

A still further object of the present invention is to provide parametric oscillation to couple a-c line power from an a-c line power source to a load.

Further objects and scope of applicability of the present invention will become apparent from the detailed description given hereinafter. The detailed description indicating the preferred embodiment of the invention is given by way of illustration only since various changes and modifications within the spirit and scope of the invention will become apparent to those skilled in the art from this detailed description.

BRIEF DESCRIPTION OF THE DRAWINGS

FIG. 1 is a block diagram of the preferred embodiment of the invention.

FIG. 3 illustrates an alternate embodiment of the present invention.

DETAILED DESCRIPTION OF THE PREFERRED EMBODIMENT

Figure 2:
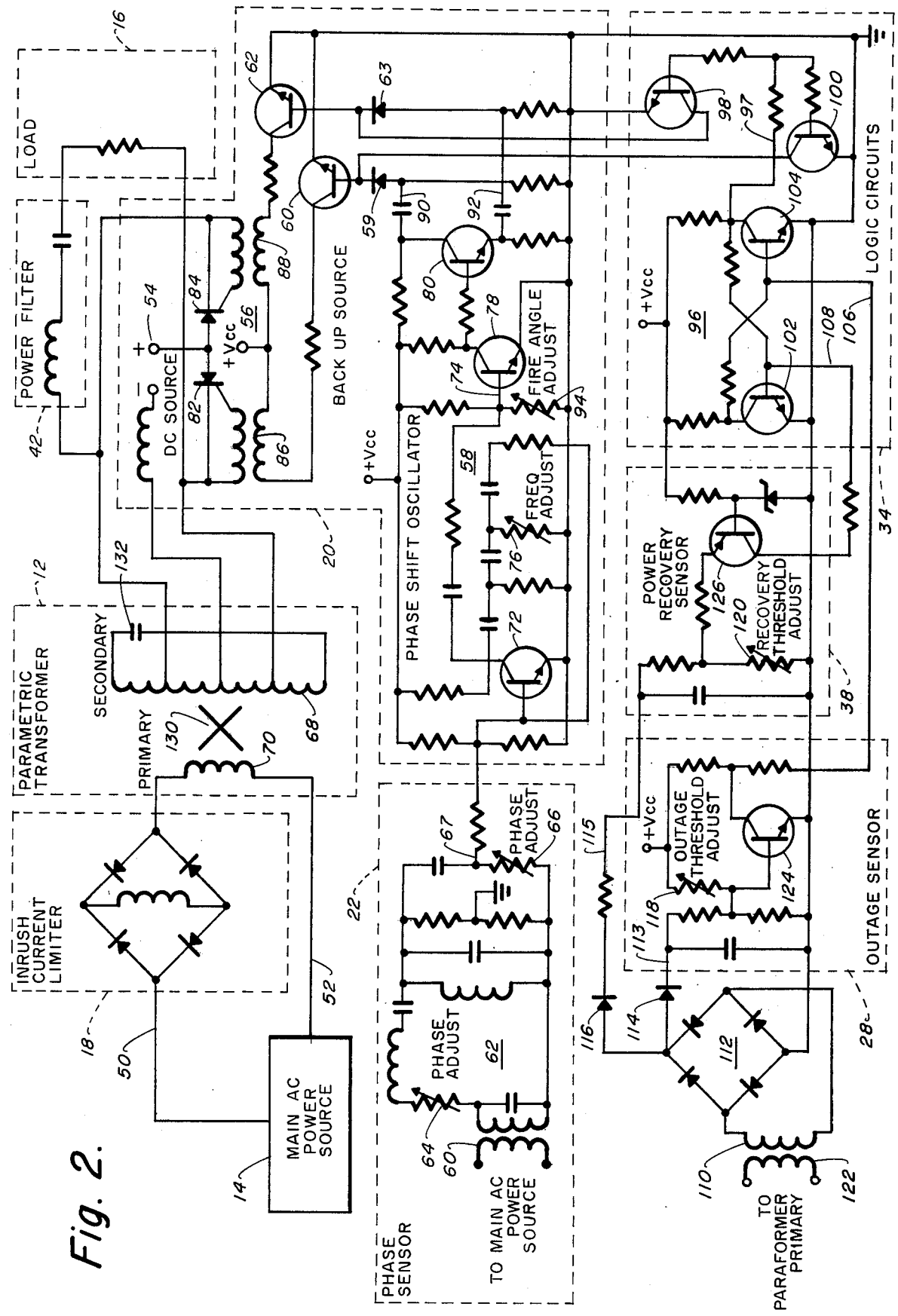
FIG. 2 is a schematic drawing illustrating the embodiment of FIG. 1 in greater detail.

FIG. 1 is a block diagram illustrating the overall system operation of the preferred embodiment. Parametric energy coupled uninterruptible power supply 10 comprises a parametric energy coupling device 12 which couples a-c line power from main a-c power source 14 to load 16. In-rush current limiter 18 disposed between main a-c power source 14 and parametric energy coupling device 12 serves to damp or ease the turn-on transients when main a-c power source 14 recovers from a power outage. In-rush current limiter 18 acts to limit the in-rush flow of current into the primary windings of parametric energy coupling device 12 to allow time for synchronizing the phase of the a-c power generated by backup source 20 with the a-c line power generated by main a-c power source 14.

Phase sensor 22 senses the phase of the a-c line power and generates a control signal on line 24 to backup source 20 for controlling the phase of the a-c power generated by backup source 20 on line 26.

Power outage sensor 28 senses a power outage in the a-c line current on line 30 via line 32. Power outage sensor 28 upon sensing a power outage transmits a control signal to logic circuits 34 via line 36. Logic circuits 34 then energize backup source 20 for providing a-c power to load 16 through parametric energy coupling device 12.

Upon recovery of the a-c line power on line 30, power recovery sensor 38 emits a control signal to logic circuits 34 via line 40. Logic circuits 34 then de-energize backup source 20, thereby removing the generation of a-c power to parametric energy coupling device 12 via line 26.

A power filter 42 coupled between parametric energy coupling device 12 and load 16 ensures that the load voltage is sinusoidal. Backup source 20 provides 60 Hertz a-c power to the load 16.

Parametric energy coupling device 12 is a parametric transformer which utilizes parametric oscillations to couple a-c line power from its primary windings to its secondary windings. It is noted that the parametric transformer 12 comprises a parametric iron core 130, primary winding 70, secondary winding 68 and capacitor 132 located in the secondary winding 68 to form a 60 Hertz resonant tank circuit. There is no direct flux coupling rendering parametric energy coupling device 12 unidirectional, i.e., it transfers a-c line power only from the primary winding to the secondary winding and will not transfer a-c power from the secondary winding to the primary winding.

Basically, the embodiment of FIG. 1 has two operating states: a normal operating mode and a backup mode. The normal operating mode occurs when a-c line power is at normal values. The backup source 20 is de-energized and a-c line power is directly coupled from main a-c power source 14 to load 16 by parametric energy coupling device 12. The backup mode occurs when an outage or low power condition exists on the a-c line power. During the backup mode, backup source 20 is energized to supply a-c power from a d-c source to load 16.

Now turning to FIG. 2, a schematic diagram of the embodiment of FIG. 1 is shown. In the normal mode, a-c line power is coupled from main a-c power source 14 across lines 50 and 52 through parametric energy coupling device or parametric transformer 12 to load 16. L-C power filter 42 is shown connected in series with load 16 to ensure a 60 Hertz sinusoidal output voltage to load 16.

Backup source 20 comprises a d-c source 54, an inverter circuit 56, a phase shift oscillator circuit 58, and a pair of trigger drive transistors 60 and 62.

Phase sensor 22 samples the a-c line power through transformer 60. The sampled a-c line power is transmitted to phase lock network 62. Phase lock network 62 imparts a 90° phase shift to the sampled a-c line power signal. Resistors 64 and 66 are adjusted to obtain the desired 90° phase shift. The 90° phase shift is required in order to synchronize the a-c power supplied to the parametric transformer secondary winding 68 by inverter circuit 56 with the a-c line power from source 14, because there is a 90° phase shift in the a-c line power across the parametric transformer 12 from primary windings 70 to secondary windings 68. The 90° phase shifted a-c signal from phase lock network 62 is transmitted to the base of transistor 72 of phase shift oscillator circuit 58 via line 67. The a-c signal on line 67 controls the phase of the a-c signal generated by phase shift oscillator 58 on line 74. Resistor 76 controls the frequency of the a-c signal generated by phase shift oscillator 58 on line 74. The a-c signal on line 74 is amplified and shaped by transistors 78 and 80. The resulting train of trigger pulses are fed to trigger drive transistors 60 and 62 through diodes 59 and 63 via lines 90 and 92, respectively. Trigger drive transistors 60 and 62 are coupled to silicon controlled rectifiers 82 and 84, respectively, through respective transformers 86 and 88. The train of pulses on lines 90 and 92 fed to trigger drive transistors 60 and 62, respectively, drives trigger drive transistors 60 and 62 to alternately fire silicon controlled rectifiers 82 and 84, thereby providing an a-c power signal to the secondary windings 68 of parametric transformers 12 from d-c source 54. Resistor 94 controls the time duration between trigger pulses on lines 90 and 92.

The energizing and de-energizing of inverter 56 is controlled by logic circuits 34, power outage sensor 28 and power recovery sensor 38. Logic circuits 34 comprise a bistable multivibrator 96 which controls the conduction states of transistors 98 and 100 via line 97. When transistors 98 and 100 are conducting, the trigger drive transistors 60 and 62 are disabled and inverter circuit 56 is de-energized or deactivated. However, when transistors 98 and 100 are in cutoff, trigger driver transistors 60 and 62 are activated to supply the trigger pulses on lines 90 and 92 to silicon controlled rectifiers 82 and 84, thus energizing or activating inverter 56.

In the normal mode of operation, transistors 98 and 100 are both conducting with transistor 102 conducting, and transistor 104 cut off in bistable multivibrator 96. Conversely, in the backup mode of operation, transistors 98 and 100 are both cut off with transistor 102 cut off and transistor 104 conducting in bistable multivibrator 96.

The state of bistable multivibrator 96 is determined by control signals on lines 106 and 108 supplied by outage sensor 28 and power recovery sensor 38, respectively. The a-c voltage across the primary winding 70 of parametric transformer 12 is sampled by transformer 110. The sampled a-c voltage is fullwave rectified by fullwave rectifier 112 and transmitted to power outage sensor 28 and power recovery sensor 38 through diodes 114 and 116, respectively. Resistor 118 sets the voltage at which the low voltage condition or power outage will be sensed while resistor 120 sets the voltage level at which the a-c power is deemed to have recovered, i.e., returned to normal values. For proper operation, the power recovery threshold must be set higher than the power outage threshold to prevent erroneous switching of bistable multivibrator 96.

With normal a-c line source voltage present on the primary winding 122 of transformer 110, both transistors 124 and 126 are conducting, thereby maintaining bistable multivibrator 96 in its normal operating mode with transistor 102 conducting and transistor 104 cut off. When the a-c voltage drops below the outage threshold level, transistor 124 stops conducting, causing the bistable multivibrator 96 to switch to its backup operating mode with transistor 102 cut off and transistor 104 conducting. As the a-c line power sensed by transformer 110 returns to normal values, transistor 126 conducts to switch bistable multivibrator 96 back to its normal operating mode with transistor 102 cut off and transistor 104 conducting. It is noted that resistor 118 may be adjusted to switch transistor 124 into cutoff at a reduction of ten percent in a-c line voltage.

The operation of the embodiment illustrated in FIG. 2 can best be explained by example. Consider initially that the embodiment shown in FIG. 2 is in the normal mode with a-c line power at its normal value. Parametric transformer 12 is supplying electrical power from the main a-c power source 14 to load 16. The inverter 56 is de-energized as transistors 98 and 100 are both conducting. Bistable multivibrator 96 and logic circuit 34 are in their normal modes with transistor 102 conducting and transistor 104 cut off. In the power recovery sensor 38 and the power outage sensor 28, both transistors 124 and 126 are conducting due to the a-c voltage present across the primary winding 122 of transformer 110. With transistors 124 and 126 conducting, bistable multivibrator 96 is thereby maintained in its normal operating mode. Main a-c power source 14 is sampled by phase sensor 22 and a 90° phase shifted a-c signal generated on line 67 which controls the phase of the 60 Hertz a-c signal generated by phase shift oscillator 58 on line 74. Phase shift oscillator 58 and wave shaping and amplifying transistors 78 and 80 operate to generate a train of trigger pulses on lines 90 and 92 at 60 Hertz frequency. In the normal mode, trigger drive transistors 60 and 62 are disabled by transistors 98 and 100 and the trigger pulses on lines 90 and 92 transmitted to trigger drive transistors 60 and 62 are not able to drive transistors 60 and 62; hence, silicon controlled rectifiers 82 and 84 remain inactivated.

Should the a-c line power voltage decrease, the voltage across the primary winding 70 of parametric transformer 12 decreases and the rectified d-c signal transmitted on lines 113 and 115 to power outage sensor 28 and power recovery sensor 38 decreases. At the power recovery threshold, transistor 126 of power recovery sensor 38 stops conducting. However, this change of state of transistor 126 from conduction to cutoff has no effect on bistable multivibrator 96. As the a-c line voltage continues to decrease, the power outage threshold level is reached causing transistor 124 in power outage sensor 28 to cut off. When transistor 124 goes from conduction to cutoff, transistor 104 in bistable multivibrator 96 conducts, thereby causing bistable multivibrator 96 to change modes with transistor 102 cut off and transistor 104 conducting. When bistable multivibrator 96 changes modes, transistors 98 and 100 are cut off due to the low voltage applied to their bases via line 97. When transistors 98 and 100 are in cutoff, trigger drive transistors 60 and 62 are activated allowing transistors 60 and 62 to supply trigger pulses to silicon controlled rectifiers 82 and 84 whereby inverter circuit 56 is energized or activated. Inverter circuit 56 draws power from d-c source 54, converts it into a-c power which is fed into secondary winding 68 of parametric transformer 12 to supply load 16 with a-c power during a power outage.

During the short duration between the power outage and the activation of inverter circuit 56, the energy stored in the resonant circuit in the secondary winding 68 of parametric transformer 12 supplies load 16 with a-c power, thus ensuring a continuous, uninterruptible a-c supply to the load. As described supra, phase shift oscillator 58 synchronizes the phase of the a-c power generated by inverter circuit 56 with the a-c line power to ensure application of constant phase a-c power to load 16 during transistion from the normal mode to the backup mode and vice versa.

When main a-c power source 14 recovers, an a-c voltage is once again sensed by transformer 60 of phase sensor circuit 22 and phase sensor circuit 22 acts to shift by 90° the phase of the signal generated by phase shift oscillator 58 with respect to the a-c line power generated by main a-c power source 14. The inrush current limiter 18 opposes the initial surge of current into the primary winding 70 of parametric transformer 12 allowing time for this phase synchronization to occur. As the inrush current limiter 18 reaches a steady state condition, voltage across the primary winding 70 of parametric transformer 12 increases up to normal operating levels. This increase is sensed by power recovery sensor 38 via line 115 and at the power recovery threshold voltage transistor 126 begins to conduct. The conduction of transistor 126 causes transistor 102 in bistable multivibrator 96 to conduct, causing bistable multivibrator 96 to return to its normal operating mode with transistor 102 conducting and transistor 104 cut off. The return of bistable multivibrator 96 to its normal mode causes transistors 98 and 100 to conduct, thereby disabling trigger drive transistors 60 and 62 from passing trigger pulses on lines 90 and 92 to inverter circuit 54, thereby de-energizing inverter circuit 56. The system has returned to its normal operating mode.

Now turning to FIG. 3, an alternate embodiment of the present invention is shown. In FIG. 3, a parallel power filter 160 is shown connected between parametric transformer 12 and load 16. Also note that the a-c signal generated by the inverter circuit 56 is fed into power filter 160 instead of directly into secondary winding 68 of parametric transformer 12, as is the case in FIG. 2.

Therefore, many modifications and embodiments of the specific invention will readily come to mind to one skilled in the art, having the benefits of the teachings presented in the foregoing description and accompanying drawings of the subject invention; hence, it is to be understood that the invention is not limited thereto and that such modifications, etc., are intended to be included within the scope of the appended claims.

What is claimed is:

1. An a-c power supply circuit comprising:
   a. transformer means for furnishing alternating current power to a load, said transformer means transferring power only from a primary winding to a secondary winding; said load communicating with said secondary winding of said transformer means;
   b. means for connecting a source of alternating current line power to said primary winding of said transformer means;
   c. backup means for converting direct current power to alternating current power and furnishing said alternating current power to said secondary winding of said transformer means;
   d. power outage sensing means associated with said backup means and responsive to said line power for providing a power outage control signal for energizing said backup means when said a-c line power drops below a first predetermined threshold level;
   e. means for sensing the phase of said a-c line power and providing a phase control signal for controlling the phase of the a-c power generated by said backup means;
   f. recovery sensing means for providing a recovery control signal for de-energizing said backup means when said a-c line power recovers to a second predetermined threshold level; said backup means including;
      (1) an inverter circuit communicating with said secondary winding;
      (2) means responsive to said phase control signal for driving said inverter circuit such that said inverter circuit generates a-c power in phase with said a-c line power;
      (3) means responsive to said power outage control signal and said recovery control signal for energizing and de-energizing, respectively, said inverter circuit; said energizing and de-energizing means including:
         (a) a bistable multivibrator responsive to said power outage control signal and to said recovery control signal, said bistable multivibrator assuming a first state when said power outage control signal is received and assuming a second state when said recovery control signal is received; and
         (b) first and second energizing transistors, responsive to said first and second state of said bistable multivibrator and communicating with said inverter driving means, for activating said inverter driving means when said bistable multivibrator is in said first state and deactivating said inverter driving means when said bistable multivibrator is in said second state.

2. The apparatus of claim 1 wherein said transformer means comprises a parametric transformer.

3. The apparatus of claim 1 wherein said connecting means comprises an inrush current limiter.

4. The apparatus of claim 1 wherein said phase sensing means comprises a phase-lock network for shifting the phase of said phase control signal with respect to said a-c line power by approximately 90°, thereby compensating for a 90° phase shift imparted to said a-c line power by said transformer means.

5. The apparatus of claim 1 wherein said recovery sensing means comprises:
   a. rectifier means responsive to said a-c line power for providing a d-c signal proportional to the amplitude of said a-c line power;
   b. detector means responsive to said d-c signal for generating said recovery control signal when said a-c line power recovers to said second predetermined threshold level.

6. The apparatus of claim 1 wherein said inverter circuit comprises:
   a. a d-c source;
   b. a first and second silicon-controlled rectifier communicating with said secondary windings, said inverter driving means, said energizing and de-energizing means; and said d-c source, for generating said a-c power.

7. The apparatus of claim 6 wherein said inverter driving means comprises:
   a. an oscillator circuit responsive to said phase control signal;
   b. first and second switching transistors, associated respectively with said first and second silicon controlled rectifiers and communicating with said oscillator circuit, for alternately switching said first and second silicon controlled rectifiers "off" and "on", thereby generating said a-c power from said d-c source.

8. The apparatus of claim 7 wherein said energizing and de-energizing means includes: first and second energizing transistors responsive to said first and second state of said bistable multivibrator and communicating respectively with said first and second switching transistors, when said first and second energizing transistors receive said first state said first and second switching transistor are activated, when said first and second energizing transistors receive said second state said first and second switching transistors are deactivated.

9. The apparatus of claim 1 wherein said inverter driving means includes:
   a. an oscillator circuit responsive to said phase control signal;
   b. first and second switching transistors, associated with said inverter circuit and communicating with said oscillator circuit, for alternatively switching said inverter circuit, thereby generating said a-c power from said d-c source.

10. The apparatus of claim 1 wherein said power outage sensing means comprises:
    a. rectifier means responsive to said a-c line power for providing a d-c signal proportional to the amplitude of said a-c line power;
    b. detector means responsive to said d-c signal for generating said power outage control signal when said a-c line power drops below said first predetermined threshold level.

11. The apparatus of claim 1 further comprising a power filter coupled between said load and said secondary winding of said transformer means.

* * * * *